(12) United States Patent
Kuehnhoefer et al.

(10) Patent No.: US 11,565,745 B2
(45) Date of Patent: Jan. 31, 2023

(54) STEERING DEVICE

(71) Applicant: Robert Bosch GmbH, Stuttgart (DE)

(72) Inventors: Thomas Kuehnhoefer, Heubach (DE); Markus Weber, Goeppingen (DE); Stefan Kersten Weber, Kernen im Remstal (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 16/772,264

(22) PCT Filed: Dec. 28, 2018

(86) PCT No.: PCT/EP2018/082831
§ 371 (c)(1),
(2) Date: Jun. 12, 2020

(87) PCT Pub. No.: WO2019/129455
PCT Pub. Date: Jul. 4, 2019

(65) Prior Publication Data
US 2021/0086827 A1    Mar. 25, 2021

(30) Foreign Application Priority Data
Dec. 27, 2017    (DE) .................... 10 2017 223 814.3

(51) Int. Cl.
*B62D 5/04*    (2006.01)
(52) U.S. Cl.
CPC ......... *B62D 5/0484* (2013.01); *B62D 5/0493* (2013.01)
(58) Field of Classification Search
CPC ............................ B62D 5/0484; B62D 5/0493
See application file for complete search history.

(56) References Cited

U.S. PATENT DOCUMENTS

2002/0022914 A1    2/2002  Kawada et al.
2017/0277607 A1*   9/2017  Samii ................. G06F 11/2033

FOREIGN PATENT DOCUMENTS

CN    101734135 A    6/2010
CN    102589602 A    7/2012
(Continued)

OTHER PUBLICATIONS

Wikipedia Article—Redundanz (Technik), Version dated Jul. 20, 2017, available at: https://de.wikipedia.org/w/index.php?title=Redundanz_(technik)&oldid=169272464 (13 pages).
(Continued)

*Primary Examiner* — Mary Cheung
(74) *Attorney, Agent, or Firm* — Maginot, Moore & Beck, LLP

(57) ABSTRACT

The disclosure relates to a steering device, more particularly to the provision of electrical steering assistance, having at least one main control unit, which is provided to control, in at least one normal operating state, operation of at least one electric motor, and having at least one auxiliary control unit, which is provided to control, in at least one faulty operating state in which a fault in and/or failure of the main control unit has occurred, operation of the electric motor. According to the disclosure, the main control unit can be operated independently of the auxiliary control unit and the auxiliary control unit is set in the normal operating state to a passive operating mode.

8 Claims, 4 Drawing Sheets

(56) References Cited

FOREIGN PATENT DOCUMENTS

| | | | |
|---|---|---|---|
| CN | 104203666 A * | 12/2014 | ............ B60T 13/745 |
| CN | 105416388 A * | 3/2016 | ........... B62D 5/0409 |
| DE | 38 12 317 A1 | 11/1988 | |
| DE | 10 2008 048 952 A1 | 4/2010 | |
| DE | 10 2010 050 819 A1 | 5/2012 | |
| DE | 10 2010 050 820 A1 | 5/2012 | |
| DE | 11 2011 105 756 B4 | 11/2014 | |
| DE | 10 2014 117 406 A1 | 6/2016 | |
| DE | 10 2015 115 423 A1 | 3/2017 | |
| DE | 102015115423 A1 * | 3/2017 | ......... B62D 15/0235 |
| DE | 10 2015 116 937 A1 | 4/2017 | |
| JP | H4-372470 A | 12/1992 | |
| JP | H11-91605 A | 4/1999 | |
| JP | 2002-59854 A | 2/2002 | |
| JP | 2003-175834 A | 6/2003 | |
| JP | 2003-175934 A | 6/2003 | |
| JP | 2006-98410 A | 4/2006 | |
| JP | 2006-329042 A | 12/2006 | |
| WO | 2007/138772 A1 | 12/2007 | |
| WO | 2013/061391 A1 | 5/2013 | |

OTHER PUBLICATIONS

International Search Report corresponding to PCT Application No. PCT/EP2018/082831, dated May 2, 2019 (German and English language document) (7 pages).

* cited by examiner

STEERING DEVICE

This application is a 35 U.S.C. § 371 National Stage Application of PCT/EP2018/082831, filed on Nov. 28, 2018, which claims the benefit of priority to Serial No. DE 10 2017 223 814.3, filed on Dec. 27, 2017 in Germany, the disclosures of which are incorporated herein by reference in their entirety.

BACKGROUND

The disclosure relates to a steering device. In addition, the disclosure relates to a steering system.

Steering systems with electric steering assistance in the form of a power steering system are known from the prior art, an electric motor being used to generate the steering assistance. A mechanical fallback level serves as a rule as a safety concept, for example in the case of a fault of an electric and/or electronic component of the steering system, which mechanical fallback level is provided to make steering possible even with failed steering assistance and to ensure controllable and safe operation. The change into purely mechanical operation is realized by way of switching off of a main control unit with high level software for controlling an operation of the electric motor and/or by way of deactivation of a power electronics system which is linked to the electric motor. A sudden switch off of the steering assistance leads, however, to a high torque jump at a steering handle of the steering system, which can be very irritating for a driver and increases the risk of an accident.

For this reason, it is proposed, for example, in DE 10 2010 050 820 A1 to control an operation of the electric motor in the case of a fault of the main control unit by means of an auxiliary control unit in the form of a monitoring computer. In this case, the auxiliary control unit serves firstly to monitor the main control unit in a normal operating state and secondly to actuate an electric motor and/or a power electronics system in a fault operating state.

Furthermore, DE 10 2008 048 952 A1 discloses a steering system with a main control unit for actuating a power electronics system and with an additional auxiliary control unit which, in the case of normal operation, serves to monitor and/or to prepare sensor data for the main control unit and, in the case of a fault of the main control unit, actuates the power electronics system for emergency running, in order to prevent a hard switch off and, as a result, an irritation of the driver.

The dual function of the auxiliary control unit leads in both cases, however, to a greatly increased computing effort and at the same time restricts flexibility and operational safety.

The object of the disclosure therefore consists, in particular, in providing a particularly efficient steering device with improved properties with regard to flexibility. The object is achieved by way of the characterizing features of the disclosure, whereas advantageous refinements and developments of the disclosure can be gathered from the detailed embodiments.

SUMMARY

The disclosure proceeds from a steering device, in particular for the provision of electric steering assistance, with at least one main control unit which is provided for controlling an operation of at least one electric motor in at least one normal operating state, and with at least one auxiliary control unit which is provided for controlling the operation of the electric motor, in particular at least temporarily, in at least one fault operating state which is, in particular, different than the normal operating state and in the case of which a malfunction and/or a failure of the main control unit occurs.

It is proposed that, in particular in the normal operating state, the main control unit can be operated independently of the auxiliary control unit, and the auxiliary control unit is in a passive operating mode in the normal operating state. By way of said configuration, in particular, flexibility of the steering device can be increased. Moreover, in particular, a computing effort can be minimized and/or a control algorithm can be simplified. Furthermore, operational safety can advantageously be increased, since an irritation of a driver in the fault operating state can be prevented. In addition, efficiency, in particular power efficiency, control efficiency, energy efficiency, installation space efficiency and/or cost efficiency, can advantageously be optimized.

In this context, a "steering device" is to be understood to mean, in particular, at least one part, in particular a subassembly, of a steering system, in particular of a vehicle and preferably of a motor vehicle. Here, the steering system is advantageously configured as a conventional steering system, in particular with a continuous mechanical connection, and is therefore different, in particular, than a steering system which is configured as a steer-by-wire steering system. In addition, the steering device can also comprise, in particular, the electric motor. Moreover, the steering device can comprise further components and/or assemblies, such as at least one steering handle, at least one power electronics system, which is preferably configured as a power inverter unit and/or output stage, for operating, in particular for actuating and/or supplying, the electric motor, and/or at least one sensor unit for detecting a rotor position of the electric motor and/or for detecting a steering angle information item from the steering handle. Furthermore, the electric motor is configured, in particular, as a servomotor, advantageously as a brushless motor, and particularly advantageously as an asynchronous motor or as a permanently excited synchronous motor. Here, the electric motor is preferably part of an electric power steering system and is provided, in particular, for producing the electric steering assistance. Here, the electric motor might be configured, for example, as a six-phase, nine-phase or as a twelve-phase electric motor. It is preferably proposed, however, that the electric motor is configured as a three-phase electric motor and/or standard electric motor. "Provided" is to be understood to mean, in particular, specifically programmed, designed and/or equipped. The fact that an object is provided for a defined function is to be understood to mean, in particular, that the object fulfills and/or carries out said defined function in at least one use and/or operating state.

Furthermore, a "control unit" is to be understood to mean, in particular, an electronic unit which has an information input, an information processing means and an information output. The control unit, in particular the main control unit and/or the auxiliary control unit, advantageously has, furthermore, at least one computing unit and/or one processor, for example in the form of a microprocessor, at least one operating memory, at least one input and/or output means, at least one operating program, at least one control routine, at least one regulating routine, at least one calculation routine and/or at least one processing routine. The main control unit comprises, in particular, high level software for controlling the operation of the electric motor. The main control unit is advantageously provided to set a motor torque of the electric motor and preferably an assistance torque of the electric motor in the normal operating state, in particular by way of actuation of the power electronics system. The auxiliary control unit has, in particular, an operative connection to the main control unit, and is provided, in particular, to replace the main control unit in the fault operating state and to assume control of the operation of the electric motor. The main control unit in the normal operating state and the auxiliary control unit in the fault operating state are advantageously provided to use at least partially the same and/or the identical, in particular existing, assemblies and connecting lines to control the operation of the electric motor, and preferably to operate the same phases of the electric motor. Furthermore, the auxiliary control unit can preferably be operated independently of the main control unit. In particular, the auxiliary control unit is provided at least and advantageously exclusively to change and/or to vary a motor torque of the electric motor and preferably an assistance torque of the electric motor in the fault operating state, in particular by way of actuation of the power electronics system. In the case of the use of a three-phase electric motor, a redundancy and advantageously a virtual six-phase operation or 2×3-phase operation can be achieved here, in particular, by way of the control of the electric motor by means of the main control unit and the auxiliary control unit. In addition, the auxiliary control unit is preferably provided at least for initiating and/or providing emergency running and/or emergency operation. Furthermore, the main control unit and/or the auxiliary control unit are/is advantageously integrated into a control device of the steering device.

Moreover, "a malfunction and/or a failure of the main control unit" is to be understood to mean, in particular, a malfunction and/or a failure of the main control unit itself and/or of a peripheral assembly which interacts with the main control unit, such as an energy supply, and a malfunction of the main control unit which is brought about as a result. Furthermore, the term that "the main control unit can be operated independently of the auxiliary control unit" is to be understood to mean, in particular, that the control of the operation of the electric motor in the normal operating state takes place by way of the main control unit and, in particular, independently of the auxiliary control unit. In this case, in particular, the main control unit is of intrinsically safe configuration and, in particular, is not provided for monitoring the auxiliary control unit. In an analogous manner, the term that "the auxiliary control unit can be operated independently of the main control unit" is to be understood to mean, in particular, that the control of the operation of the electric motor in the fault operating state takes place by way of the auxiliary control unit and, in particular, independently of the main control unit. In this case, in particular, the auxiliary control unit is of intrinsically safe configuration and, in particular, is not provided for monitoring the main control unit. Furthermore, a "passive operating mode" is to be understood to mean, in particular, an idle mode which is, in particular, energy-saving and/or a standby mode which is, in particular, energy-saving and in which the auxiliary control unit, in particular, is not operated and/or is inactive and, in particular, does not fulfill an active function.

Furthermore, it is proposed that the main control unit is provided to supply an operating signal, in particular an operating status, in the normal operating state, and to transmit it, in particular, to the auxiliary control unit, in particular in a wireless manner, such as optically and/or inductively, and/or in a wired manner. The auxiliary control unit is provided, in particular, to detect and/or to evaluate the operating signal. In addition, the auxiliary control unit is provided, in particular, to determine the malfunction and/or the failure of the main control unit in a manner which is dependent on an absence of the operating signal and, in particular, to initiate a fault operating mode which is linked with the fault operating state and in which the auxiliary control unit is provided to control the operation of the electric motor. To this end, the main control unit is preferably connected electrically to the auxiliary control unit. As a result, a fault operating state can advantageously be detected simply, in particular even in an operating state in which the auxiliary control unit is in a passive operating mode. In addition, computationally intensive monitoring of the main control unit by means of the auxiliary control unit can advantageously be dispensed with.

The operating signal might be, for example, a continuous signal. Particularly high energy efficiency, however, can be achieved, in particular, if the operating signal is a discontinuous signal, and the main control unit is provided to supply the operating signal at regular time intervals.

The main control unit is preferably provided to supply the operating signal at time intervals of at least 1 ms and advantageously of at least 5 ms and/or of at most 100 ms and advantageously of at most 50 ms, and to transmit it to the auxiliary control unit. As a result, in particular, operational safety can be increased, reliable detection of the fault operating state can be ensured, and advantageous energy efficiency can be achieved at the same time.

If a computing capacity of the auxiliary control unit is lower than a computing capacity of the main control unit, additional costs for the auxiliary control unit can be reduced, in particular. Here, the computing capacity of the auxiliary control unit is preferably at least 10% lower, advantageously at least 25% lower, preferably at least 50% lower, and particularly preferably at least 75% lower than the computing capacity of the main control unit.

The auxiliary control unit can be provided, in particular, to operate, in particular to block and/or to brake, the electric motor in the fault operating state in such a way that a stepped reduction of a motor torque, in particular of an assistance torque, of the electric motor is achieved and, in particular, the steering assistance is reduced in a stepped manner. It is proposed in accordance with one preferred refinement of the disclosure, however, that the auxiliary control unit is provided to operate, in particular to block and/or to brake, the electric motor in the fault operating state in such a way that at least ramping out of a motor torque, in particular of an assistance torque, of the electric motor is achieved. Here, the auxiliary control unit is preferably provided to operate the electric motor in the fault operating state in such a way that the motor torque, in particular the assistance torque, of the electric motor is reduced continuously and, in particular, not suddenly. Therefore, the provided steering assistance is preferably reduced continuously, as a result of which, in particular, an advantageously smooth and/or unobtrusive change into purely mechanical operation can be achieved and an irritation of the driver can be prevented.

It is proposed in a further refinement of the disclosure that the auxiliary control unit is provided to operate the electric motor in the fault operating state in such a way that a motor torque, in particular assistance torque, of the electric motor can be generated, which motor torque is equivalent to the normal operating state. Here, the auxiliary control unit is preferably provided to operate the electric motor in the fault operating state in a way which is equivalent with respect to the main control unit, advantageously in such a way that a full motor torque, in particular assistance torque, can be supplied. Furthermore, the auxiliary control unit is advantageously provided to set the motor torque of the electric motor and preferably the assistance torque of the electric motor in the fault operating state, in particular by way of actuation of the power electronics system. To this end, in particular, the auxiliary control unit can comprise high level software for controlling the operation of the electric motor. As a result, an irritation of the driver can advantageously be reduced further, since steering assistance can be provided even in a fault operating state, which steering assistance makes comfortable steering possible for the driver. In addition, operational safety can advantageously be increased, since both a control path which is assigned to the main control unit and a further control path which is assigned to the auxiliary control unit are independent of one another and at the same time are sufficiently safe for the operation of the electric motor.

Furthermore, it is proposed that the steering device comprises at least one power electronics system, in particular the power electronics system already mentioned above, for operating the electric motor, the auxiliary control unit being provided to actuate the power electronics system in the fault operating state, in particular indirectly, such as via a separate driver electronics system, or advantageously directly. As a result, in particular, advantageously high operational safety can be achieved and/or an advantageously simple control algorithm can be provided.

As an alternative or in addition, it is proposed that the steering device comprises at least one switching unit for splitting at least one phase of the electric motor and advantageously for selectively splitting the individual phases of the electric motor, the auxiliary control unit being provided to actuate the switching unit in the fault operating state, in particular indirectly or advantageously directly. Here, the switching unit advantageously comprises a plurality of switching elements, a number of switching elements preferably being adapted to a number of phases, in particular in such a way that each phase of the electric motor is assigned precisely one of the switching elements. Further, the switching unit is advantageously arranged in terms of circuitry between the power electronics system and the electric motor. As a result, a computing capacity of the auxiliary control unit can advantageously be reduced further, as a result of which an auxiliary control unit with a minimum chipset for minimum additional costs can advantageously be provided.

Moreover, it is proposed that the steering device comprises at least one monitoring unit, for example a further switching unit, a level converter, a line attenuator, a line amplifier and/or a separate driver electronics system for the power electronics system, which is provided at least to prevent operation of the electric motor by way of the main control unit in the fault operating state in a manner which is dependent on an actuating signal of the auxiliary control unit. As a result, in particular, operational safety can be increased, since the main control unit can advantageously be disconnected from the remaining assemblies in the case of a fault.

Here, the steering device is not to be restricted to the above-described use and embodiment. In particular, in order to fulfill a method of operation described herein, the steering device can have a number which differs from a number mentioned herein of individual elements, components and units.

BRIEF DESCRIPTION OF THE DRAWINGS

Further advantages result from the following description of the drawings. Exemplary embodiments of the disclosure are shown in the drawings. The drawings and the description contain numerous features in combination. A person skilled in the art will also expediently consider the features individually and combine them to form appropriate further combinations.

In the drawings.

DETAILED DESCRIPTION

Figure 1:
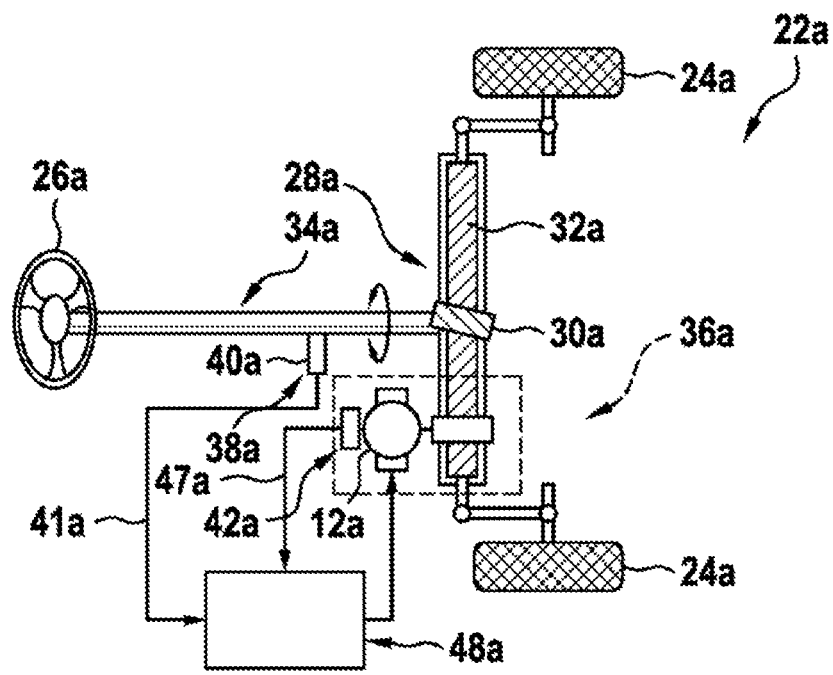
FIG. 1 shows an exemplary steering system with a steering device in a simplified illustration.

FIG. 1 shows an exemplary steering system 22*a* in a simplified illustration. The steering system 22*a* is configured as a conventional steering system with a continuous mechanical connection. In addition, the steering system 22*a* is configured as an electrically assisted steering system, and accordingly has an electric power steering system. Furthermore, the steering system 22*a* is provided for use in a vehicle (not shown), in particular a motor vehicle.

In an installed state, the steering system 22*a* has an operative connection to vehicle wheels 24*a* of the vehicle and is provided to influence a driving direction of the vehicle.

The steering system 22*a* comprises a steering device. The steering device comprises a steering handle 26*a* which is configured in the present case by way of example as a steering wheel and is provided for applying a manual steering torque. As a consequence, the steering handle 26*a* serves to introduce a steering command and, in particular, to control the driving direction of the vehicle manually, in particular by way of a driver.

Moreover, the steering device has a steering gear 28*a* which is configured in the present case as a rack and pinion steering mechanism which is known per se. The steering gear 28*a* comprises a steering pinion 30*a* and a rack 32*a* which is coupled mechanically to the steering pinion 30*a*. The steering gear 28*a* is provided to bring about a pivoting movement and/or rotational movement of the vehicle wheels 24*a* and, in particular, to convert a steering command into a steering movement of the vehicle wheels 24*a*.

For the mechanical connection of the steering handle 26*a* to the steering gear 28*a*, the steering device furthermore comprises a steering column 34*a*. The steering column 34*a* comprises at least one torsion element (not shown), in particular a torsion bar in the present case, which is provided for a rotation in a manner which is dependent on the steering command.

Furthermore, the steering device comprises an electrically configured assistance unit 36*a* for producing and/or providing steering assistance. The assistance unit 36*a* is provided to introduce an assistance torque into the steering gear 28*a* and to assist the manual steering torque which is applied, in particular, by the driver.

To this end, the assistance unit 36*a* comprises an electric motor 12*a* which is configured in the present case, in particular, as a permanently excited synchronous motor. The electric motor 12*a* is configured as a multiple-phase, in the present case three-phase, electric motor. The electric motor 12*a* is connected operatively to the steering gear 28*a*, in particular the rack 32*a*. The electric motor 12*a* is provided to generate a motor torque, in particular an assistance torque.

Here, the electric motor 12a is part of the electric power steering system and serves, in particular, to produce the electric steering assistance. In principle, however, an electric motor might also be configured as a six-phase or as a twelve-phase electric motor.

Furthermore, the steering device has a first sensor unit 38a. The first sensor unit 38a comprises at least one angle sensor 40a which is configured, for example, as a torque sensor, and is provided to detect a steering angle information item 41a from the steering handle 26a. In the present case, the first sensor unit 38 is arranged in a region of the torsion element, and is provided to detect a steering angle information item 41a in the form of a torque signal, which steering angle information item 41a is correlated, in particular, with the torsion element. Here, the torque signal is a measure of the manual steering torque which is applied, in particular, by the driver. The first sensor unit 38a can also advantageously have at least two angle sensors, however, as a result of which an advantageous redundancy can be achieved, in particular.

Furthermore, the steering device has a second sensor unit 42a. The second sensor unit 42a comprises at least one rotor position sensor 44a, 46a and, in the present case, advantageously two rotor position sensors 44a, 46a (cf., in particular, FIG. 2). The second sensor unit 42a is arranged in a region of the electric motor 12a and is provided to detect a rotor position signal 47a of the electric motor 12a. In principle, however, a second sensor unit might also have precisely one rotor position sensor or at least three rotor position sensors.

Moreover, the steering device has a control device 48a. The control device 48a has an operative connection to the first sensor unit 38a, the second sensor unit 42a and the assistance unit 36a. The control device 48a is provided to actuate the electric motor 12a and therefore, in particular, to set the motor torque, in particular in a manner which is dependent on the steering angle information item 41a and the rotor position signal 47a.

Figure 2:
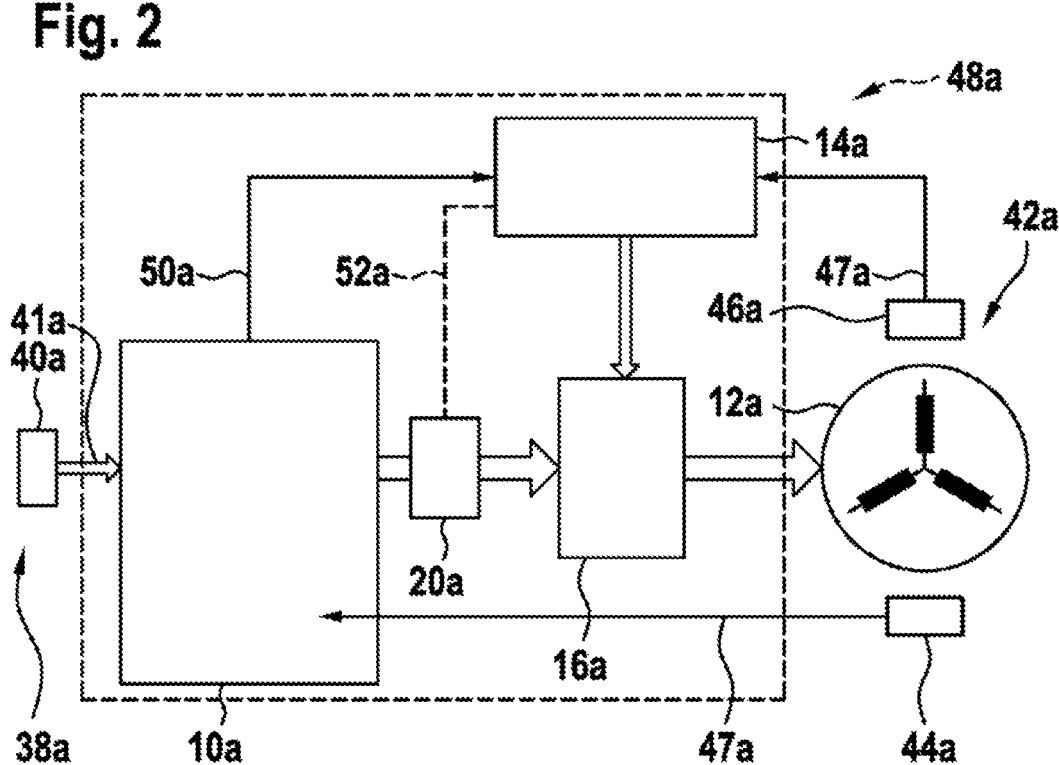
FIG. 2 shows a diagrammatic illustration of an actuation of an electric motor of the steering device.

FIG. 2 shows a simplified, diagrammatic construction of the control device 48a and, in particular, a simplified outline block circuit diagram for the actuation of the electric motor 12a.

The steering device comprises a main control unit 10a. In the present case, the main control unit 10a is integrated into the control device 48a. In principle, however, a main control unit might also be configured separately from a control device. The main control unit 10a comprises at least one processor (not shown), for example in the form of a microprocessor. In addition, the main control unit 10a can comprise at least one operating memory (not shown). Furthermore, the main control unit 10a comprises at least one operating program which is stored in the operating memory with at least one calculation routine, at least one control routine and at least one processing routine. Furthermore, the main control unit 10a has an electric connection to the first sensor unit 38a and the second sensor unit 42a, in particular a first rotor position sensor 44a of the rotor position sensors 44a, 46a.

Moreover, the steering device comprises a power electronics system 16a which is known per se and is configured as an output stage. In the present case, the power electronics system 16a is integrated into the control device 48a. In principle, however, a power electronics system might also be configured separately from a control device. The power electronics system 16a has an electric connection to the main control unit 10a and the electric motor 12a. The power electronics system 16a is arranged between the main control unit 10a and the electric motor 12a. The power electronics system 16a is provided to convert a pulsating rectified voltage of an energy source into a phase current and to feed it via a respective center tap to the electric motor 12a, in particular a respective phase of the electric motor 12a. In principle, however, it is also conceivable to dispense with a power electronics system or to integrate a power electronics system into a main control unit and/or an auxiliary control unit.

In a normal operating state, the main control unit 10a is provided to control an operation of the electric motor 12a. Here, the main control unit 10a is provided to receive the steering angle information item 41a and the rotor position signal 47a and to set the motor torque of the electric motor 12a by way of actuation of the power electronics system 16a.

Since, in the case of a steering system, this is a safety-relevant vehicle component with a direct influence on the driver and/or vehicle guidance, a corresponding safety concept is required in a fault operating state, in which a malfunction and/or a failure of the main control unit 10a itself and/or of a peripheral assembly which interacts with the main control unit 10a, such as an energy supply, and a malfunction brought about as a result of the main control unit 10a occur. A mechanical fallback level, for example, can serve as safety concept, which mechanical fallback level comprises at least the steering handle 26a, the steering column 34a and the steering gear 28a, and makes steering possible even with failed steering assistance. A sudden switch off of the steering assistance in the case of a change into the mechanical operation leads, however, to a high torque jump at the steering handle 26a, which can be very irritating for the driver and increases the risk of an accident.

In order, in particular, to prevent an irritation of the driver in a case of this type, the steering device comprises an auxiliary control unit 14a. In the present case, the auxiliary control unit 14a is integrated into the control device 48a. The auxiliary control unit 14a comprises at least one processor (not shown), for example in the form of a microprocessor. Furthermore, the auxiliary control unit 14a comprises at least one further operating memory (not shown) with a further operating program which is stored in the further operating memory.

The auxiliary control unit 14a is configured separately from the main control unit 10a. Furthermore, the auxiliary control unit 14a is structurally different than the main control unit 10a. A computing capacity of the auxiliary control unit 14a is lower by at least 50% here than a computing capacity of the main control unit 10a. In principle, however, an auxiliary control unit might also be configured separately from a control device. Furthermore, a computing capacity of an auxiliary control unit might also be identical or approximately identical to a computing capacity of a main control unit.

Furthermore, the auxiliary control unit 14a has an electric connection to the main control unit 10a and to the power electronics system 16a. In addition, the auxiliary control unit 14a has an electric connection to the second sensor unit 42a, in particular a second rotor position sensor 44a of the rotor position sensors 44a, 46a. In the present case, however, the auxiliary control unit 14a is free from an electric connection to the first sensor unit 38a. Fundamentally, however, an auxiliary control unit might also have an electric connection to a first sensor unit, as shown in some of the following exemplary embodiments, for example.

Moreover, the auxiliary control unit 14a and the main control unit 10a can be operated independently of one another. The auxiliary control unit 14a is in a purely passive operating mode in the normal operating state, and is provided to control the operation of the electric motor 12a exclusively in the fault operating state. In the present case, the auxiliary control unit 14a is provided to replace the main control unit 10a in the fault operating state and to assume control of the operation of the electric motor 12a, in order to initiate emergency running and/or emergency operation. In addition, the auxiliary control unit 14a is provided to use at least partially the same and/or the identical, in particular existing, assemblies and connecting lines to control the operation of the electric motor 12a and to operate the same phases of the electric motor 12a as the main control unit 10a. As a result, in the case of the use of a three-phase electric motor 12a, a redundancy can be achieved and a virtual six-phase operation or 2×3-phase operation can advantageously be achieved. In the present case, the auxiliary control unit 14a is provided to actuate the power electronics system 16a directly in the fault operating state and, as a result, to operate the electric motor 12a in such a way that ramping out of the motor torque, in particular of the assistance torque, of the electric motor 12a is achieved and steering movements at the steering handle 26a are advantageously damped. Here, in particular, the motor torque of the electric motor 12a and therefore the provided steering assistance are reduced continuously and, in particular, not suddenly by way of the auxiliary control unit 14a, as a result of which, in particular, an advantageously gentle and/or unobtrusive change into the mechanical operation is achieved and an irritation of the driver can be prevented.

In order to determine the fault operating state, in particular the malfunction and/or the failure of the main control unit 10a, the main control unit 10a is provided to supply an operating signal 50a in the normal operating state and, in particular, to transmit it to the auxiliary control unit 14a. In the present case, the operating signal 50a is a discontinuous signal, and is transferred from the main control unit 10a to the auxiliary control unit 14a at regular time intervals of between 1 ms and 100 ms. The auxiliary control unit 14a which is, in particular, passive in the normal operating state is provided to detect the operating signal 50a. In the case of a malfunction and/or a failure of the main control unit 10a, the operating signal 50a is no longer generated by the main control unit 10a, with the result that the auxiliary control unit 14a can determine the malfunction and/or the failure of the main control unit 10a on the basis of an absence of the operating signal 50a, and, in particular, can initiate a fault operating mode which is linked to the fault operating state and in which the auxiliary control unit 14a assumes the control of the operation of the electric motor 12a. Fundamentally, however, an operating signal might also correspond to a continuous signal.

Moreover, the steering device in the present case comprises a monitoring unit 20a. In the present case, the monitoring unit 20a is integrated into the control device 48a. In principle, however, a monitoring unit might also be configured separately from a control device. The monitoring unit 20a has an electric connection to the auxiliary control unit 14a. In addition, the monitoring unit 20a has an electric connection to the main control unit 10a and the power electronics system 16a. In the present case, the monitoring unit 20a is arranged between the main control unit 10a and the power electronics system 16a. The monitoring unit 20a can be configured, for example, as a switching unit, as a level converter, as a line attenuator, as a line amplifier and/or as a separate driver electronics system for the power electronics system 16a. The monitoring unit 20a is configured at least to prevent an operation of the electric motor 12a by way of the main control unit 10a in the fault operating state in a manner which is dependent on an actuating signal 52a of the auxiliary control unit 14a. Here, in the present case, the monitoring unit 20a is provided at least to decouple the main control unit 10a from the power electronics system 16a, as a result of which, in particular, operating safety can be increased, since the main control unit 10a can be disconnected from the remaining assemblies in the case of a fault. In principle, however, it is also conceivable to completely dispense with a monitoring unit. Furthermore, a monitoring unit might also be integrated, for example, in the form of a driver electronics system for a power electronics system into the power electronics system, a main control unit and/or an auxiliary control unit.

Moreover, the steering device and/or the control device 48a can comprise further components and/or assemblies, such as an energy supply circuit and/or a switching unit for disconnecting at least one phase of the electric motor 12a.

Figure 3A:
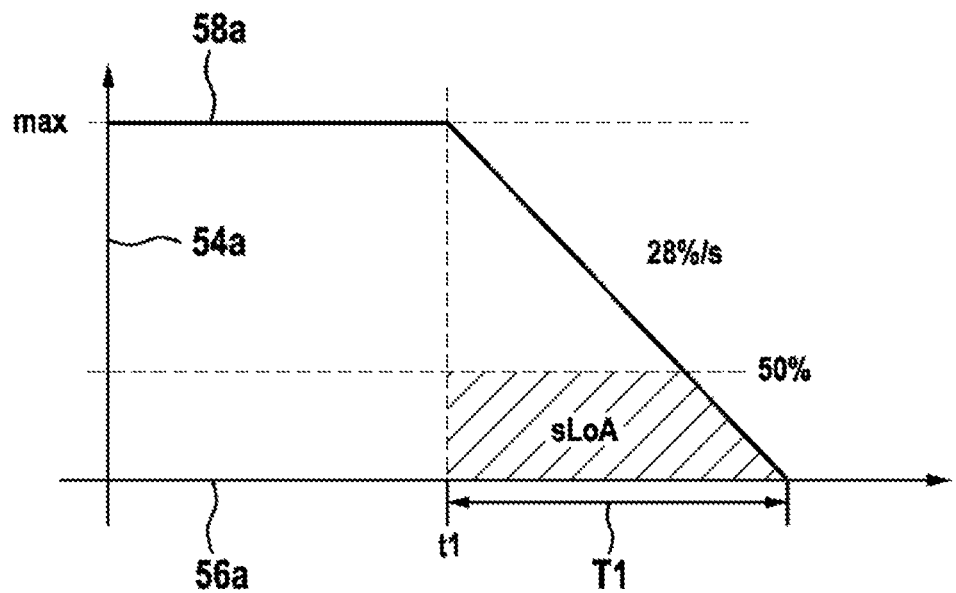
FIGS. 3*a-b* show an exemplary diagram of ramping out of a motor torque of the electric motor in a fault operating state.
Figure 3B:
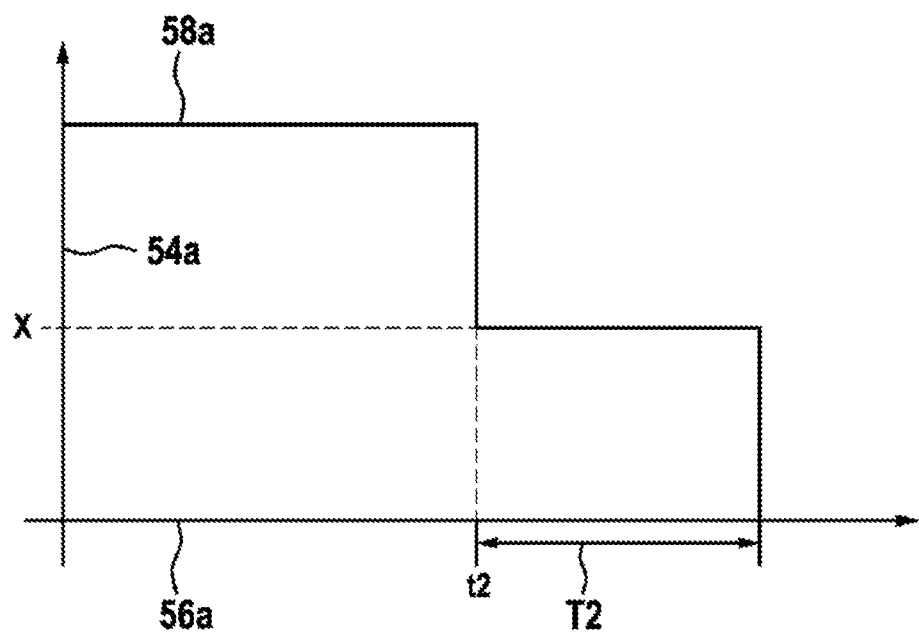

FIGS. 3a and 3b in each case show an exemplary profile of the motor torque of the electric motor 12a. An ordinate axis 54a is configured in each case as a magnitude axis and shows a degree of the steering assistance in %. An abscissa axis 56a is configured in each case as a time axis. A curve 58a in each case shows the motor torque of the electric motor 12a.

In FIG. 3a, a malfunction and/or a failure of the main control unit 10a occurs at a time t1. Subsequently, the auxiliary control unit 14a is provided to operate the electric motor 12a in such a way that ramping out of the motor torque of the electric motor 12a is achieved, with the result that the steering assistance is reduced continuously. A time duration T1 which characterizes the ramping out of the motor torque of the electric motor 12a is between 0.5 seconds and 5 seconds here. A highlighted region characterizes a region of a sudden loss of the steering assistance (sudden loss of assistance=sLoA).

FIG. 3b shows an alternative to FIG. 3a. In this case, a malfunction and/or a failure of the main control unit 10a occurs at a time t2. Subsequently, the auxiliary control unit 14a is provided to operate the electric motor 12a in such a way that a stepped reduction of the motor torque of the electric motor 12a is achieved, with the result that the steering assistance is reduced in a stepped manner. In the present case, the auxiliary control unit 14a is provided to reduce the motor torque of the electric motor 12a and therefore the steering assistance over a further time duration T2 to a value x from the time t2. The further time duration T2 which characterizes, in particular, a reduction of the motor torque of the electric motor 12a to an infinitesimal motor torque is between 3 seconds and 5 seconds here. The value x lies between 15% and 30% of a maximum motor torque. Even if FIG. 3b shows merely one step by way of example, an auxiliary control unit can also be provided to actuate an electric motor with a plurality of steps, in order to achieve a stepped reduction of the motor torque of an electric motor.

FIGS. 4 to 7 show further exemplary embodiments of the disclosure. The following descriptions and the drawings are restricted substantially to the differences between the exemplary embodiments, it being possible for reference to fundamentally also be made to the drawings and/or the description of the other exemplary embodiments, in particular of FIGS. 1 to 3b, with regard to identically designated components, in particular in relation to components with identical designations. In order to distinguish the exemplary embodiments, the letter a is added behind the designations of the exemplary embodiment in FIGS. 1 to 3b. In the exemplary embodiments of FIGS. 4 to 7, the letter a is replaced by the letters b to e.

Figure 4:
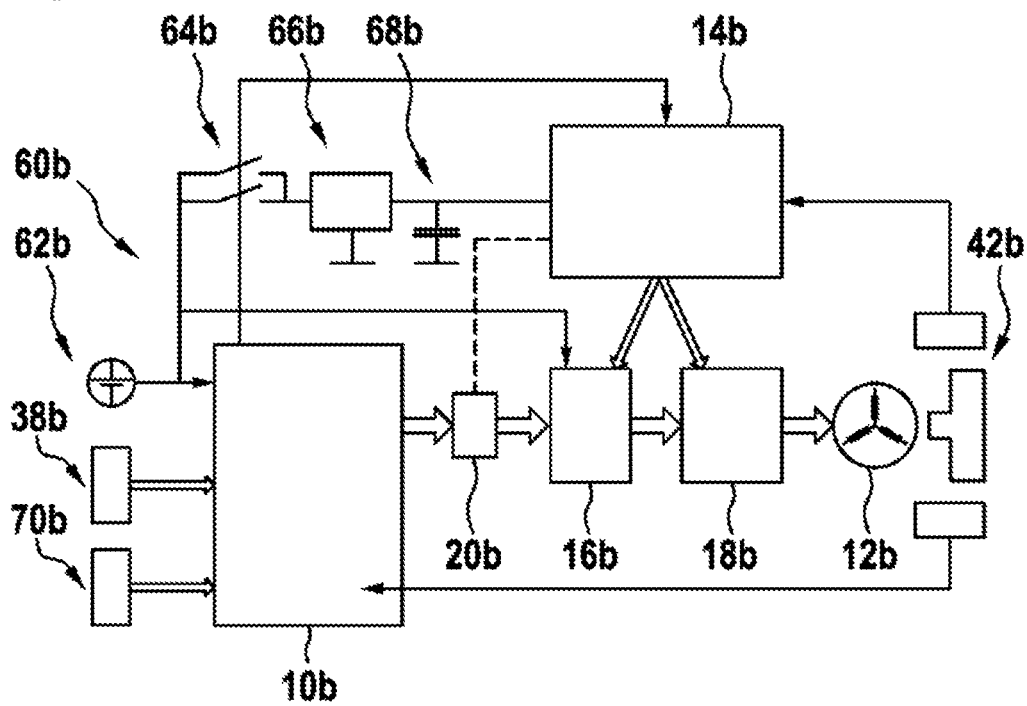
FIGS. 4-7 show further exemplary embodiments of steering devices for providing electric steering assistance.

FIG. 4 shows a further exemplary embodiment of the disclosure with a further steering device in a more detailed illustration. The letter b is placed behind the exemplary embodiment of FIG. 4.

Here, in an analogous manner to the preceding exemplary embodiment, the steering device comprises a main control unit 10b, an auxiliary control unit 14b, an electric motor 12b, a power electronics system 16b, a first sensor unit 38b, a second sensor unit 42b and a monitoring unit 20b, in the present case, in particular, in the form of a separate driver electronics system for the power electronics system 16b.

Furthermore, the main control unit 10b has an additional link to a vehicle bus system 70b.

Moreover, in this case, the steering device comprises a switching unit 18b. The switching unit 18b has an electric connection to the auxiliary control unit 14b. In addition, the switching unit 18b has an electric connection to the power electronics system 16b and the electric motor 12b. In the present case, the switching unit 18b is arranged between the power electronics system 16b and the electric motor 12b. The switching unit 18b is provided to disconnect the individual phases of the electric motor 12b selectively. To this end, the switching unit 18b comprises a plurality of switching elements (not shown), each phase of the electric motor 12b being assigned precisely one of the switching elements in the present case.

In this case, in particular in addition or as an alternative to the actuation of the power electronics system 16b, the auxiliary control unit 14b is provided to actuate the switching unit 18b in the fault operating state and, as a result, to operate the electric motor 12b in such a way that at least ramping out of a motor torque, in particular of an assistance torque, of the electric motor 12b is achieved.

Furthermore, FIG. 4 additionally shows an energy supply circuit 60b of the steering device. In this case, the main control unit 10b and the power electronics system 16b have a direct connection to an energy source 62b, for example in the form of a vehicle on-board electric system, and the auxiliary control unit 14b has an indirect connection to the same energy source 62b. In order to attach the auxiliary control unit 14b to the energy source 62b, the energy supply circuit 60b can comprise, for example, at least one connecting switch 64b, at least one voltage regulator 66b and/or at least one capacitor 68.

Figure 5:
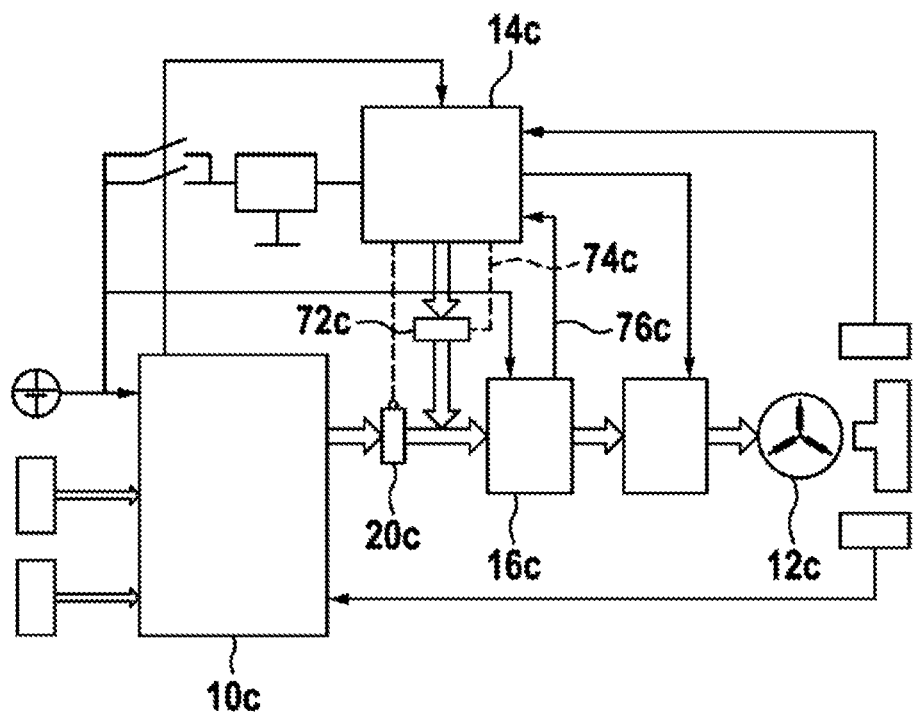

FIG. 5 shows a further exemplary embodiment of the disclosure. The letter c is placed behind the exemplary embodiment of FIG. 5. The further exemplary embodiment of FIG. 5 differs from the preceding exemplary embodiments at least substantially as a result of an attachment of an auxiliary control unit 14c of a steering device to a power electronics system 16c of the steering device.

In this case, the auxiliary control unit 14c is connected indirectly to the power electronics system 16c at least for controlling an operation of an electric motor 12c in a fault operating state.

To this end, the steering device comprises a further monitoring unit 72c which is arranged between the auxiliary control unit 14c and the power electronics system 16c. The further monitoring unit 72c can be configured, for example, as a switching unit, as a level converter, as a line attenuator, as a line amplifier and/or as a separate driver electronics system for the power electronics system 16c. The further monitoring unit 72c is provided to enable and/or to optimize the operation of the electric motor 12c of the steering device by way of the auxiliary control unit 14c in the fault operating state in a manner which is dependent on a further actuating signal 74c of the auxiliary control unit 14c, as a result of which particularly high operational safety can be achieved in the case of a malfunction and/or a failure of a main control unit 10c. Here, the further monitoring unit 72c can advantageously interact with a monitoring unit 20c which is arranged, in particular, between the main control unit 10c and the power electronics system 16c as a toggle switch. In this case, the monitoring unit 20c and the further monitoring unit 72c serve to actuate the power electronics system 16c in an alternating manner by way of the main control unit 10c and the auxiliary control unit 14c.

Moreover, in this case, the auxiliary control unit 14c is provided to detect a current in the power electronics system 16c by means of a connecting line 76c, as a result of which at least temporary regulation of a motor torque of the electric motor 12c can be achieved.

Figure 6:
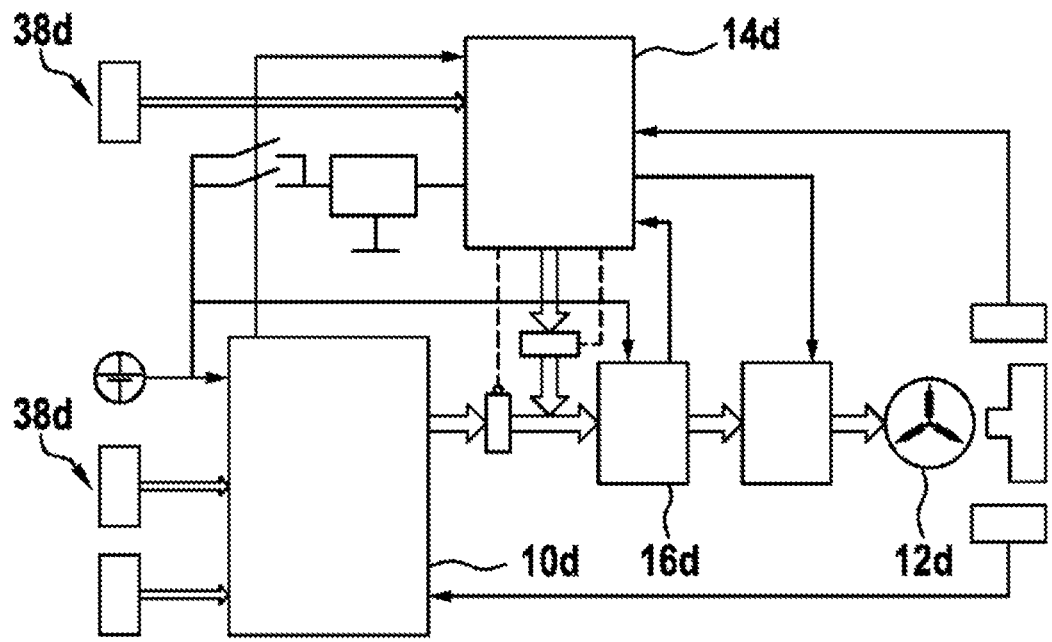

FIG. 6 shows a further exemplary embodiment of the disclosure. The letter d is placed behind the exemplary embodiment of FIG. 6. The further exemplary embodiment of FIG. 6 differs from the preceding exemplary embodiments at least substantially as a result of an embodiment of an auxiliary control unit 14d of a steering device.

In this case, a computing capacity of the auxiliary control unit 14d is identical or approximately identical to a computing capacity of a main control unit 10d. The auxiliary control unit 14d is provided to replace the main control unit 10d in a fault operating state and to assume control of an operation of an electric motor 12d. Here, the auxiliary control unit 14d is provided to actuate a power electronics system 16d in the fault operating state and, as a result, to operate the electric motor 12d in such a way that a motor torque, in particular assistance torque, of the electric motor 12d can be generated, which motor torque is equivalent to a normal operating state. As a consequence, the auxiliary control unit 14d is provided to operate the electric motor 12d in the fault operating state in a way which is equivalent to the main control unit 10d, to be precise in such a way that a full assistance torque can be provided. To this end, the auxiliary control unit 14d has an electric connection to a first sensor unit 38d for the detection of a steering angle information item, in particular a torque signal, from a steering handle.

Figure 7:
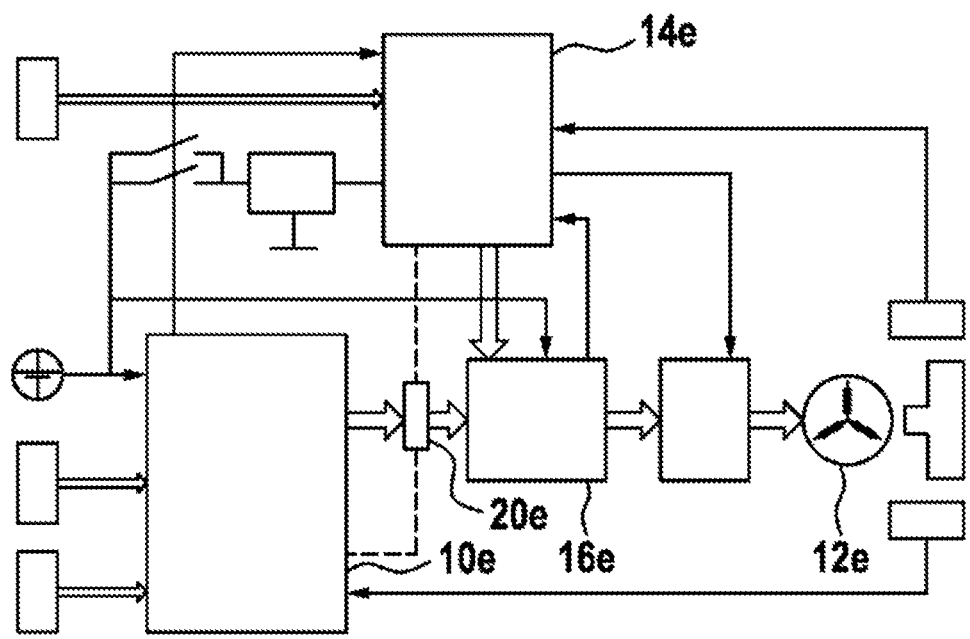

FIG. 7 shows a further exemplary embodiment of the disclosure. The letter e is placed behind the exemplary embodiment of FIG. 7.

In this case, an auxiliary control unit 14e is likewise provided to actuate a power electronics system 16e in a fault operating state and, as a result, to operate an electric motor 12e in such a way that a motor torque, in particular assistance torque, of the electric motor 12e can be generated, which motor torque is equivalent to a normal operating state. Here, however, the auxiliary control unit 14e is provided for direct actuation of the power electronics system 16e. Here, a driver electronics system (not shown) for the power electronics system 16e is integrated into the auxiliary control unit 14e. As a result, a driver electronics system for the power electronics system 16e as a fault path can also advantageously be covered, too, by way of a single-chip solution.

Furthermore, in this case, a main control unit 10e is provided for actuation of a monitoring unit 20e, as a result of which a flexibility of the steering device and/or monitoring of a control signal of the main control unit 10e can be improved further.

The invention claimed is:

1. A steering device for providing electric steering assistance, the steering device comprising:
   at least one main control unit configured to control an operation of at least one electric motor in at least one normal operating state; and
   at least one auxiliary control unit configured to control the operation of the at least one electric motor in at least one fault operating state in which at least one of a malfunction and a failure of the at least one main control unit occurs, the at least one auxiliary control unit being in a passive operating mode in the at least one normal operating state, the passive operating mode being at least one of an idle mode and a standby mode,
   wherein the at least one main control unit is operable independently of the at least one auxiliary control unit, and
   wherein a computing capacity of the at least one auxiliary control unit is lower than a computing capacity of the at least one main control unit.

2. The steering device as claimed in claim 1, wherein:
   the at least one main control unit is configured to supply an operating signal in the at least one normal operating state; and
   the at least one auxiliary control unit is configured to determine the at least one of the malfunction and the failure of the at least one main control unit depending on an absence of the operating signal.

3. The steering device as claimed in claim 2, wherein the operating signal is a discontinuous signal and the at least one main control unit is configured to supply the operating signal at regular time intervals.

4. The steering device as claimed in claim 2, wherein the at least one main control unit is configured to supply the operating signal at time intervals of at least 1 ms and of at most 100 ms.

5. The steering device as claimed in claim 1, wherein the at least one auxiliary control unit is configured to operate the at least one electric motor in the at least one fault operating state such that at least ramping out of a motor torque of at least one the electric motor is achieved.

6. The steering device as claimed in claim 1, wherein the at least one auxiliary control unit is configured to operate the at least one electric motor in the at least one fault operating state such that a motor torque of the configured electric motor is generated that is equivalent to that of the at least one normal operating state.

7. The steering device as claimed in claim 1, wherein the at least one auxiliary control unit is configured to actuate at least one power electronics system in the at least one fault operating state, the at least one power electronics system being configured to operate the at least one electric motor.

8. The steering device as claimed in claim 1, wherein the at least one auxiliary control unit is configured to actuate at least one switching unit in the at least one fault operating state, the at least one switching unit being configured to split at least one phase of the at least one electric motor.

* * * * *